United States Patent [19]

Mori et al.

[11] Patent Number: 5,007,722
[45] Date of Patent: Apr. 16, 1991

[54] MIRROR APPARATUS WITH VIBRATOR FOR REMOVING WATER DROPS

[75] Inventors: Keiji Mori, Kariya; Hidekazu Kogita, Toyota, both of Japan

[73] Assignee: Aiskin Seiki Kabushiki Kaisha, Kariya, Japan

[21] Appl. No.: 345,302

[22] Filed: May 1, 1989

[30] Foreign Application Priority Data

Apr. 30, 1988 [JP] Japan ............................ 63-058903[U]

[51] Int. Cl.⁵ ............................ G02B 5/08; B60R 1/06
[52] U.S. Cl. ................................... 350/382; 15/250 B
[58] Field of Search ............... 350/582, 583, 588, 631; 15/250 R, 250 B

[56] References Cited

U.S. PATENT DOCUMENTS

| 4,471,258 | 9/1984 | Kumada | 310/354 |
| 4,768,256 | 9/1988 | Motoda | 15/250 R |
| 4,833,373 | 5/1989 | Doi et al. | 350/582 |
| 4,929,072 | 5/1990 | Fujie et al. | 350/582 |

FOREIGN PATENT DOCUMENTS

| 57-70745 | 5/1982 | Japan | 350/582 |
| 59-8548 | 1/1984 | Japan | 350/582 |
| 60-193739 | 10/1985 | Japan | 350/582 |
| 61-30552 | 2/1986 | Japan | 350/582 |
| 1079782 | 8/1967 | United Kingdom | 350/582 |

Primary Examiner—Bruce Y. Arnold
Assistant Examiner—R. D. Shafer
Attorney, Agent, or Firm—Oblon, Spivak, McClelland, Maier & Neustadt

[57] ABSTRACT

A mirror apparatus includes a body, a mirror member having at opposite sides thereof a reflecting surface and a backside and positioned within the body. A vibrating member generates vibrations and is secured to the backside of the mirror member. A pressing device continually pressing the vibrating member against the backside of the mirror member.

5 Claims, 4 Drawing Sheets

MIRROR APPARATUS WITH VIBRATOR FOR REMOVING WATER DROPS

BACKGROUND OF THE INVENTION

1. Field of the Invention

The present invention relates to a mirror apparatus with a means for removing water drops, and in particular to a mirror apparatus in which water drops on a reflecting surface of a mirror member are atomized by a vibrator so as to be removed therefrom.

2. Description of the Related Art

A conventional mirror apparatus of this type is shown, for example, in Japanese Patent Laid-Open Publication No. 59-8548 published without examination on Jan. 17, 1984. In this mirror apparatus used as a side-mirror of a vehicle, a mirror member has secured thereto, at a backside thereof, a vibrating member. Upon actuation of the vibrating member, a high-frequency vibration is transmitted to the mirror member, thereby atomizing water drops on the mirror member. Thus, water drops are removed from the mirror member.

However, in this mirror apparatus, since the mirror member has a much greater mass than the vibrating member, vibration cannot be transmitted effectively from the latter to the former.

SUMMARY OF THE INVENTION

It is, therefore, a primary object of the present invention to provide a mirror apparatus without the aforementioned drawback.

Another object of the present invention is to provide a mirror apparatus in which a vibration can be transmitted effectively from a vibrating member to a mirror member.

To achieve the objects and in accordance with the purposes of the present invention, a mirror apparatus is comprised of a body, a mirror member having at opposite sides thereof a reflecting surface and a backside and positioned within the body, a vibrating member generating vibrations and secured to the backside of the mirror member, and pressing means for continually pressing on the vibrating member and in a direction towards the backside of the mirror member.

BRIEF DESCRIPTION OF THE DRAWINGS

The above and other objects, features and advantages of the present invention will become more apparent and more readily appreciated from the following detailed description of preferred exemplary embodiments of the present invention, taken in connection with the accompanying drawings, in which.

DETAILED DESCRIPTION OF THE PREFERRED EMBODIMENT

Figure 1:
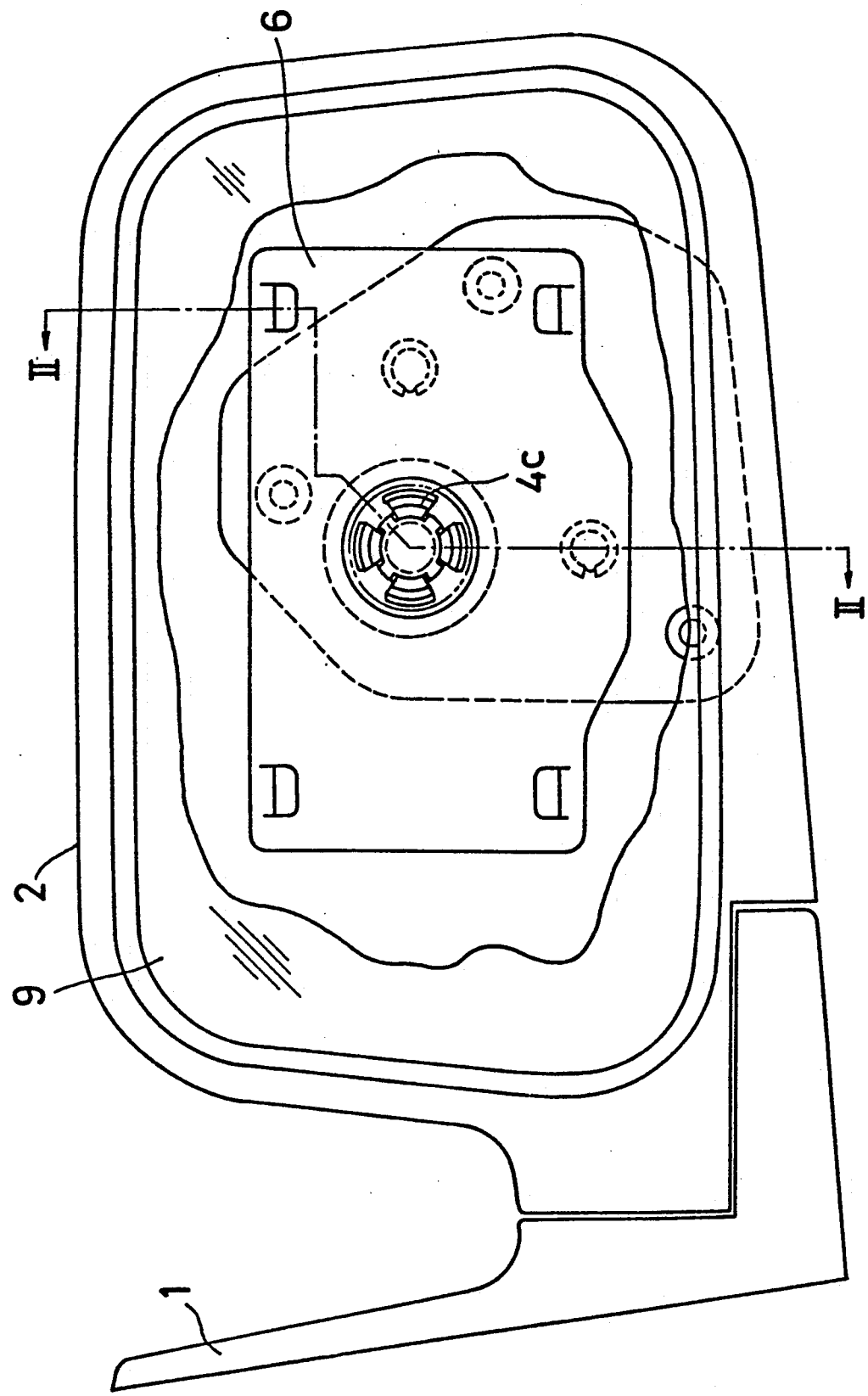
FIG. 1 is a front view of a mirror apparatus according to one embodiment of the present invention.
Figure 2:
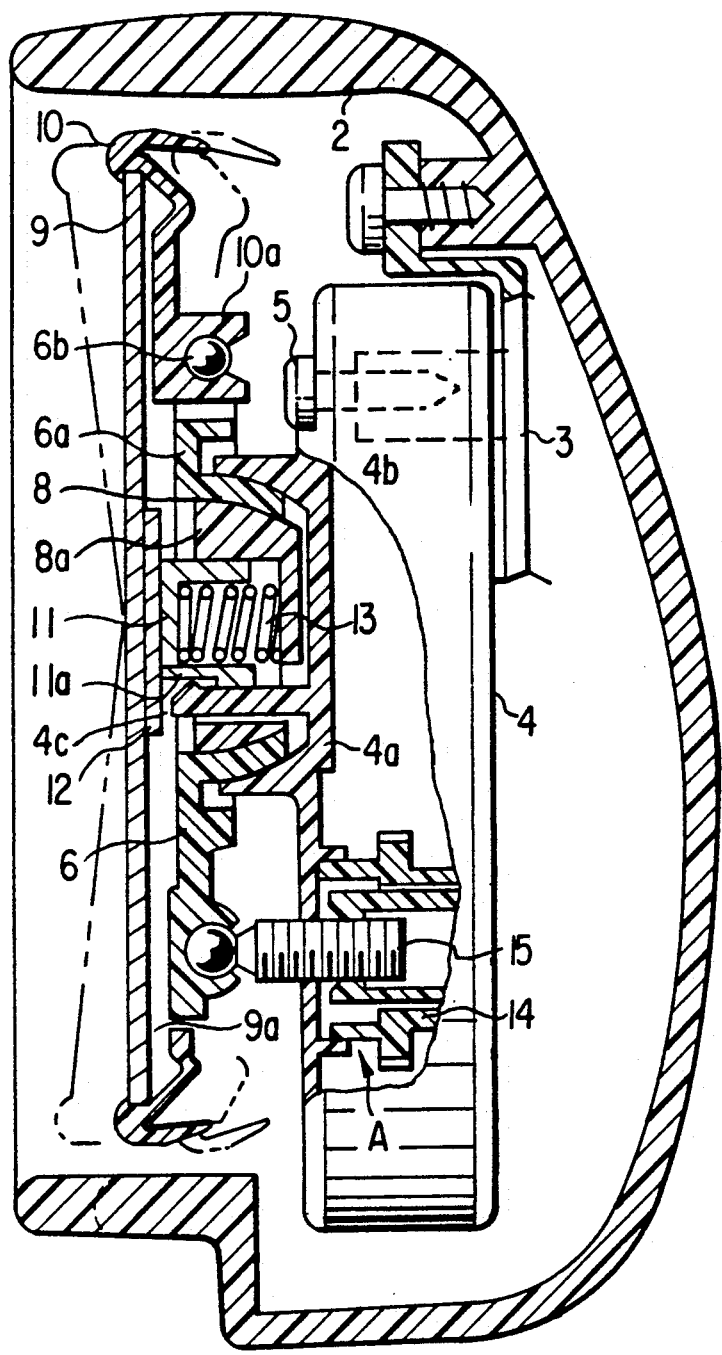
FIG. 2 is a cross-sectional view taken along line II—II in FIG. 1.
Figure 3:
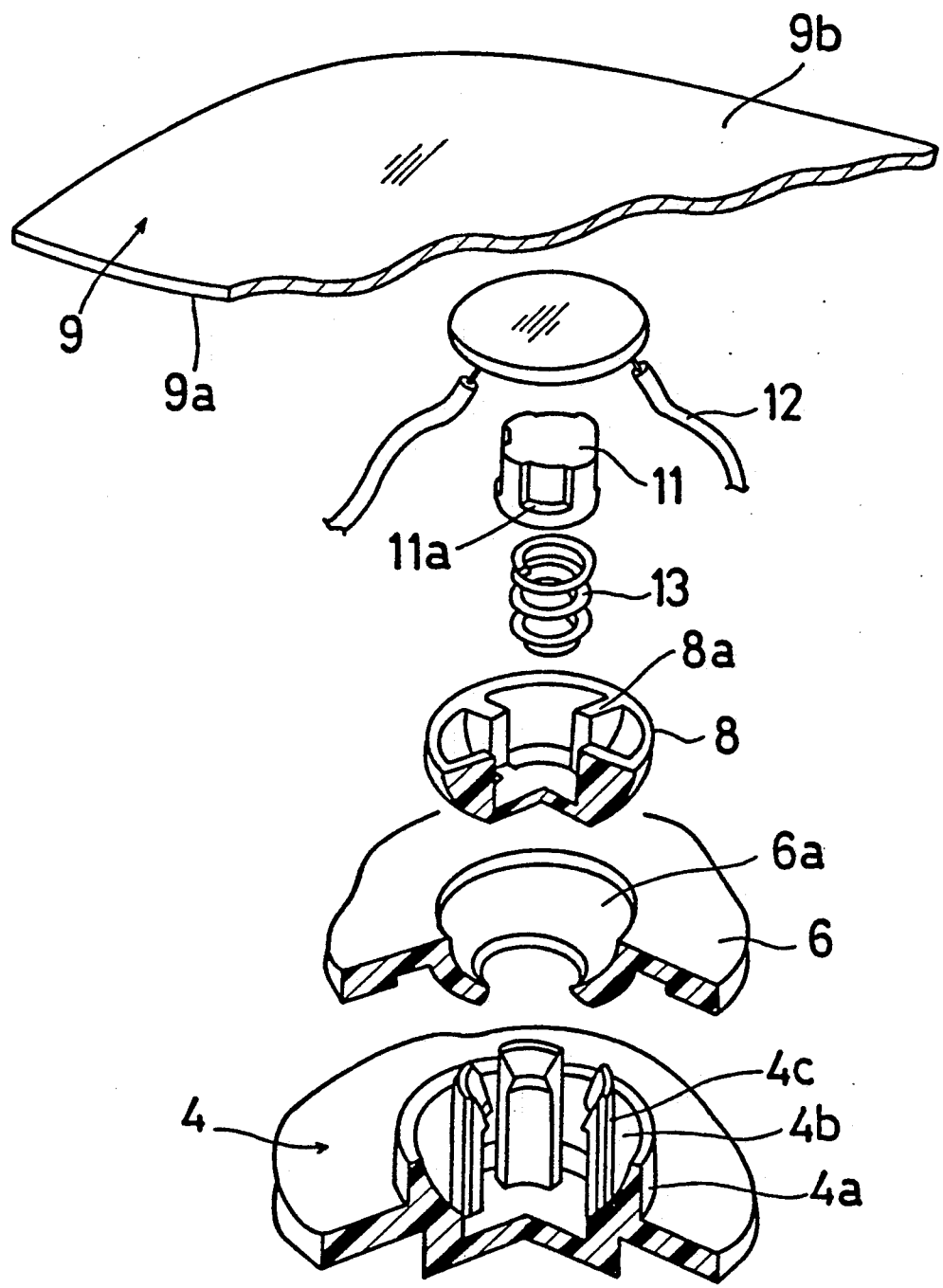
FIG. 3 is an exploded view of a main portion of FIG. 2.

Referring now to FIGS. 1 through 3, a body 2 of a mirror apparatus is rotatably mounted on a base member 1 which is secured to a door of a vehicle. A frame 3 which is movable relative to the base member 1 is secured to the body 2 at an interior portion thereof. A case 4 as a stationary member is secured to the frame 3. In the case 4, there is installed an actuator A for adjusting the rotational position of a mirror member 9. The actuator A has a rod 15 which is movable in the axial direction relative to a support element 14 when a motor (not shown) is turned on. Since a spherical distal end of the rod 15 is connected with a supporting member 6 which supports the mirror member 9 as will be detailed later, the rotating position of the mirror member 9 can be adjustable by the axial stroke of the rod 15.

An inner portion of an annular projection 4a of the case 4 is formed with a semi-spherical surface 4b. Within the projection 4a are arranged four equally spaced pawls 4c. A cup-shaped portion 6a of the supporting member 6 is in sliding abutment on the semi-spherical surface 4b of the case 4. A semi-spherical member 8 is mounted in the cup-shaped portion 6a of the supporting member 6. There are four equally pitched projections 8a formed in the member 8. Each pawl 4c of the case 4 extends through the central aperture of the supporting member 6 and is inserted in a portion of the member 8 which is defined between two adjacent projections 8a.

A compressed spring 13 and a stopper 11, both of which are co-axially arranged, are inserted in the member 8. The stopper has circumferentially spaced ribs 11a. Each rib 11a of stopper 11 is engagable with a distal end of a pawl 4c, however the ribs and pawls 4c are separated from each other in the illustrated condition (FIG. 3) so as not to interfere with pivoting of the mirror. In this condition, the biasing force of the spring 13 acts as an engaging or connecting force between the member 8 and the supporting member 6.

An outer periphery of the mirror member 9 is secured by a mirror frame 10. A portion 10a of the mirror frame 10 and an axis portion 6b of the supporting member 6 are connected with each other for unitary movement thereof.

A vibrating member 12 at which ultrasonic vibration is generated is disposed between the stopper 11 and a backside 9a of the mirror member 9 and is secured to the backside 9a of the mirror member 9 by a suitable bonding agent. The stopper 11 is also urged or pressed onto the vibrating member 12 by the spring 13.

When the vibrating member 12 is turned on, the vibration is transmitted to the mirror member 9 for a predetermined time, thereby atomizing water drops on a reflecting surface 9b of the mirror member 9. Thus, water drops are removed from the reflecting surface 9b of the mirror member 9. It should be noted that the vibration is transmitted effectively to the mirror member 9 from the vibrating member 12 since the spring loaded stopper pressing on the mirror member via the vibrating member 12 increases the resonant frequency of the mirror member.

Figure 4:
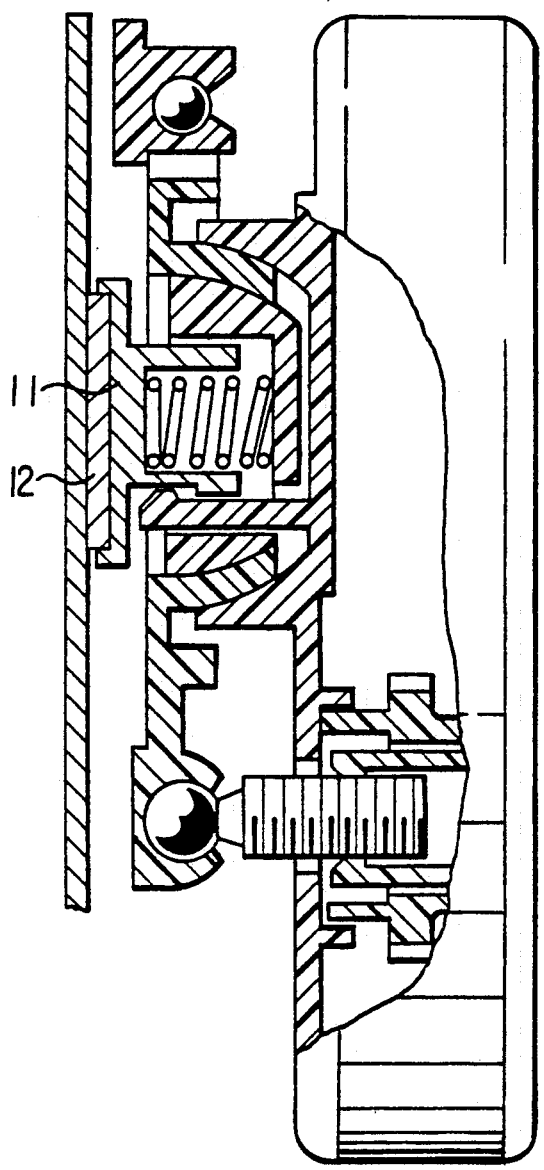
FIG. 4 is a cross-sectional view of the other embodiment of the present invention.

In light of the fear of the separation of the vibrating member 12 from the backside 9a of the mirror member 9, as shown in FIG. 4 the vibrating member 12 can be snugly fitted in the stopper 11.

While the invention has been particularly shown and described in detail with reference to preferred embodiments thereof, it will be understood by those skilled in the art that the foregoing and other change in form and details can be made therein without departing from the spirit and scope of the invention.

What is claimed is:

1. A mirror apparatus comprising:

a body;

a mirror member having at opposite sides thereof a reflecting surface and a backside and positioned within the body;

a vibrating member comprising means for generating vibrations and secured to the backside of the mirror member; and a compressed spring comprising pressing means for continually pressing on the vibrating member in a direction towards the backside of the mirror member, whereby vibrations from the vibrating members are effectively transmitted to the mirror member.

2. A mirror apparatus according to claim 1, including means for mounting said mirror member so as to be movable relative to the body.

3. A mirror apparatus comprising:

a body;

a mirror member having at opposite sides thereof a reflecting surface and a backside and positioned within the body;

a stationary member secured within the body;

a supporting member having means for pivotally mounting the mirror member thereon;

a vibrating member comprising means for generating vibrations and secured to the backside of the mirror member;

actuator means for modifying the position of the mirror member; and pressing means comprising a compressed spring for pressing on the vibrating member in the direction of the mirror member, whereby vibrations from the vibrating member are effectively transferred to the mirror member.

4. A mirror apparatus according to claim 3 including a stopper interposed between the vibrating member and the pressing means, wherein said vibrating member is snugly fitted therewith.

5. A mirror apparatus according to claim 3, wherein the actuator is installed in the stationary member.

* * * * *

UNITED STATES PATENT AND TRADEMARK OFFICE
CERTIFICATE OF CORRECTION

PATENT NO. : 5,007,722
DATED : April 16, 1991
INVENTOR(S) : Keiji Mori et al.

It is certified that error appears in the above-identified patent and that said Letters Patent is hereby corrected as shown below:

On the title page item [73] should read --Aisin Seiki Kabushiki Kaisha, Kariya, Japan--.

Signed and Sealed this

First Day of December, 1992

*Attest:*

DOUGLAS B. COMER

*Attesting Officer*  Acting Commissioner of Patents and Trademarks